United States Patent [19]
Dienes et al.

[11] Patent Number: 4,484,962
[45] Date of Patent: Nov. 27, 1984

[54] METHOD AND APPARATUS FOR APPLYING STRAIN RELIEF TO A CABLE SPLICE

[75] Inventors: Zoltan B. Dienes, Annandale; Thomas L. Mineur, High Bridge, both of N.J.

[73] Assignee: Thomas & Betts Corporation, Raritan, N.J.

[21] Appl. No.: 571,400

[22] Filed: Jan. 17, 1984

[51] Int. Cl.³ .................... H01B 13/00; H01R 13/58
[52] U.S. Cl. .................... 156/49; 156/313; 174/135; 339/104; 403/41
[58] Field of Search .................... 156/49, 293, 313; 174/65 R, 135; 339/103 R, 104, 107; 403/41

[56] References Cited
U.S. PATENT DOCUMENTS

| | | | |
|---|---|---|---|
| 311,611 | 2/1885 | Sawyer . | |
| 554,716 | 2/1896 | McEvoy . | |
| 692,890 | 2/1902 | McEvoy . | |
| 2,913,791 | 11/1959 | Martin | 24/126 |
| 3,112,975 | 12/1963 | Hämel | 339/89 |
| 3,499,103 | 3/1970 | Pearce | 174/135 |
| 3,800,068 | 3/1974 | Torgerson | 174/135 |
| 3,951,504 | 4/1976 | Clark | 339/103 |
| 4,164,621 | 8/1979 | Silva | 156/49 X |
| 4,358,634 | 11/1982 | Dienes | 174/88 R |

*Primary Examiner*—Robert Dawson
*Attorney, Agent, or Firm*—Robert M. Rodrick; Salvatore J. Abbruzzese

[57] ABSTRACT

A method and apparatus for providing strain relief to a cable splice area is disclosed. A length of flexible cord is secured to the cable on each side of the splice. A frictional substrate is supported over the cord and the cable. The frictional substrate is compressily secured to the cable thereby frictionally supporting the cord to the cable.

15 Claims, 6 Drawing Figures

METHOD AND APPARATUS FOR APPLYING STRAIN RELIEF TO A CABLE SPLICE

FIELD OF THE INVENTION

The invention relates generally to a method and apparatus for providing strain relief across a cable splice and more particularly to a method and apparatus for providing strain relief by transferring tensile stress on the cable jacket to either end of the splice.

BACKGROUND OF THE INVENTION

In telecommunications systems, cables normally employed in transmitting signals include many small diameter insulated wires surrounded in an outer jacket. These cables are used both indoors and outdoors and can be suspended horizontally or vertically. When used outdoors, the cable may even be buried underground. Thus, the cable must be sealed against moisture and other environmental hazards. Often, due to line failure or routine maintenance, one or more wires must be joined or spliced together. This necessitates violating the integrity of the cable to make such repair or splice. After entering the cable, the exposed cable splice is resealed. Typically, these resealing techniques include wrapping or covering the exposed cable area, which lies between two extents of jacketed cable. While the splice may be protected by such splice techniques from adverse environmental hazards, the splice may be further affected by cable strain caused by tensile stress which is present where the cable is suspended or buried.

Tensile stress in cable can be caused by a number of external influences. Weather conditions such as freezing temperature may cause the cable jacket to shrink, thus exerting axial forces longitudinally on both sides of the splice area. In direct burial application, the pressure exerted on the cable by the shifting earth can place considerable stress on the cable jacket. Also, when installing such cable, the cable is often pulled longitudinally through ducts or other conduit. It can thus be appreciated that the splice area of the cable must be provided with adequate strain relief in order to protect the electrical connections, by preventing the strain from being transferred from the cable jacket to the connections or conductors themselves.

Presently, the industry is employing various techniques to provide strain relief for cable splices. One known method employs a rigid metal bar which spans the splice. As the metal bar is preformed, a different length bar is needed for different lengths of cable splice areas. The appropriate bar is secured at each end by metal compression members such as hose clamps. In order to secure the metal bar to the cable, the engagement of hose clamps around the cable jacket must be extremely tight. Such tightening around the cable may cause the conductors in the cable to be compressed, causing what is known in the industry as "shine". Shine occurs when the conductors are so compressed against one another that the thin insulative jacket around each conductor is rubbed away causing two or more conductors to short. The use of metal clamps and bars also presents other significant disadvantages. The metal parts could, if overcompressed, pierce the insulative jacket and contact the conductors which would also cause a short. Further, these compression type clamps may become loose, as in time, the plastic cable jacket has a tendency to deform or cold flow. In this case, the strain relief will no longer be effective. Additionally, as these metal devices are rigid, the flexibility of the cable, at the splice area, is greatly reduced.

In addition to hose clamps, it is also known to use insulation-piercing compression clamps to secure the strain relief device to the cable jacket. However these clamps are also adversely affected by cold flow of the plastic jacket and tend to become loose in time. In addition, with insulationpiercing teeth, there is always the possibility of contacting the conductors, if overtightened, thus causing a short.

Flexible strain relief connecting devices which span electrical connections are also known. Examples of such devices are shown in U.S. Pat. No. 3,499,103 issued Mar. 3, 1980 and U.S. Pat. No. 2,913,791 issued Nov. 24, 1959. While these patents disclose techniques for providing strain relief to an electrical connection, they require special equipment in the form of clamps and wire not normally carried by a cable installer. These connecting devices are also craft sensitive, requiring precise alignment of the parts for proper installation. Thus the resulting connection will be time consuming and expensive.

SUMMARY OF THE INVENTION

It is an object of the present invention to provide an effective, economical and simple method and apparatus for providing strain relief to a cable splice.

It is a further object to provide a method and apparatus for providing strain relief to a cable splice which can be easily field installed, using no special equipment or tools. The invention would be applicable to cable splices of various lengths and would result in a flexible connection which will not damage the cable conductors and would not be subject to slippage upon cold flow or deformation of the cable.

In the efficient attainment of these and other objectives of the present invention contemplates a method of providing strain relief to a cable splice including securing a length of flexible cord to the cable on each side of the splice. The method further includes applying compression to the cord and the cable to secure the cord across the splice.

DETAILED DESCRIPTION OF THE PRESENTED EMBODIMENT

Figure 1:
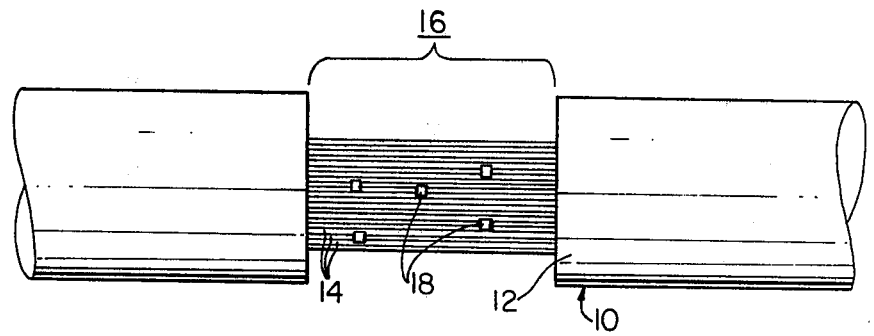
FIG. 1 is a side elevational view of an extent of insulated telecommunications cable with a central splice area exposed revealing conductors extending therethrough and electrical connections made therein.

Referring to the drawings, FIG. 1 shows an extent of telecommunications cable 10 having an outer cylindrical insulative jacket 12 and a plurality of individually insulated conductors 14 extending therethrough. While the method of the present invention is shown for use with telecommunications cable, it is contemplated that this method may be employed with any jacketed cable.

The central area of cable 10 is exposed at 16 to access the conductors 14. This exposed portion, commonly referred to as a splice or splice area, permits repair, splicing or other work to be done on conductors 14. Such splices, connections or repairs are shown schematically at 18. After such repair or splicing is accomplished, the splice area 16 may be covered with any of a variety of commercially available splice covers (not shown). These splice covers reestablish the integrity of the cable after it has been violated. An example of one such splice cover is shown in commonly assigned U.S. Pat. No. 4,358,634 issued Nov. 9, 1982 and entitled PROTECTIVE COVER FOR USE IN SEALED CABLE SPLICES. As the present invention relates to a method of providing strain relief, regardless of the type of covering employed, the conductors 14 will be shown exposed throughout the drawings. However, it is understood that the splice area is normally closed and sealed either before or after employing the strain relief method of the present invention.

Referring now to FIGS. 2 through 5, the method of the present invention is described. In FIGS. 2 through 5, for simplicity of explanation, only one-half of the cable 10, adjacent the splice area 16 is shown. It can be appreciated that the half not shown is secured in the same manner as is to be described.

Figure 2:
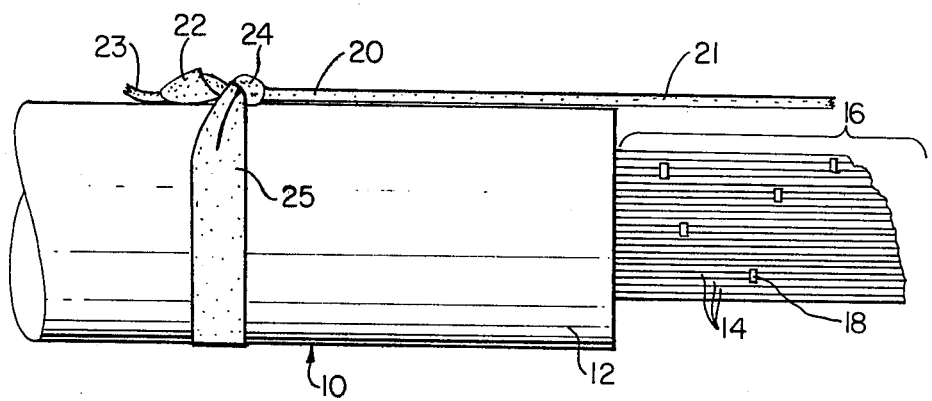
FIGS. 2 through 4 show successive steps of the method of providing strain relief in accordance with the present invention, shown on one side of the splice area of FIG. 1.

As shown in FIG. 2 a length of flexible cord 20 is secured to the cable 10 on either side of splice area 16. A suitable length of cord 20 is cut from a reel thereof (not shown). The particular length chosen will vary according to the length of splice area 16. Typically the splice area 16 may be anywhere between six (6) and sixty (60) inches long. The length of cord 20 employed will be suitably longer than the splice area 16 itself. Cord 20 is a flexible aramid fiber which is unidirectionally woven and formed in a flat tape-like member. An example of a suitable cord is that sold by New England Printed Tape Co., Pawtucket, R.I. under the trademark "MULETAPE". Cord 20 is rated at a strength of approximately 800 pounds, although cords of other ratings may also be employed.

A knot 22 is placed at each end 23 of the cord 20. The knot 22, as can be seen in FIG. 2, will provide a stop surface to prevent the end 23 of cord 20 from pulling out from a loop made at the end of cord 20, as will hereinafter be described. The cord 20 is then looped around cable jacket 12 (shown by looped portion 25) adjacent the splice 16 and secured preferably by a half-hitch knot 24. As is shown in the drawings, end knot 22 is placed on the opposite side of half-hitch knot 24 relative to cable splice 16. By pulling on the central portion 21 of cord 20, the half-hitch knot 24 will become tighter and provide a secure grip around cable jacket 12. As described, end knot 22 prevents the end 23 of cord 20 from slipping out under the half-hitch knot 24. Tensile stress exerted on the looped portion 25 of cord 20, by pulling axially on the central portion 21 of cord 20, is similar to the tensile stress which is exerted on the cable 10, around the splice area 16 during installation and use. Thus, as the tensile stress is increased, the half-hitch knot 24 will tighten around cable jacket 12. Thus, strain placed on cable jacket 12 on one side of splice 16 will be transferred through cord 20 to the other side of cable jacket 12 and not through the conductors 14 or connections 18. In order to prevent slippage of the looped portion 25 of cord 20 in a relaxed or non-tensioned state, the present invention contemplates compressively frictionally securing the cord 20 to the cable 10.

Figure 3:
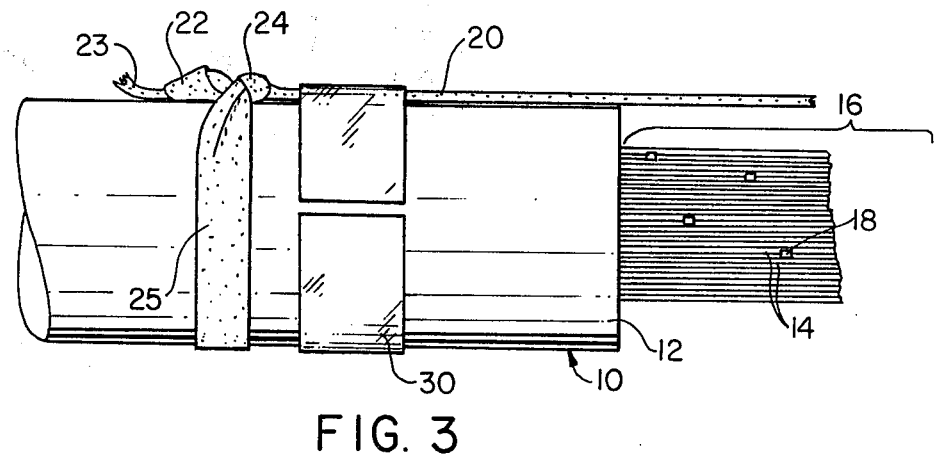
Figure 4:
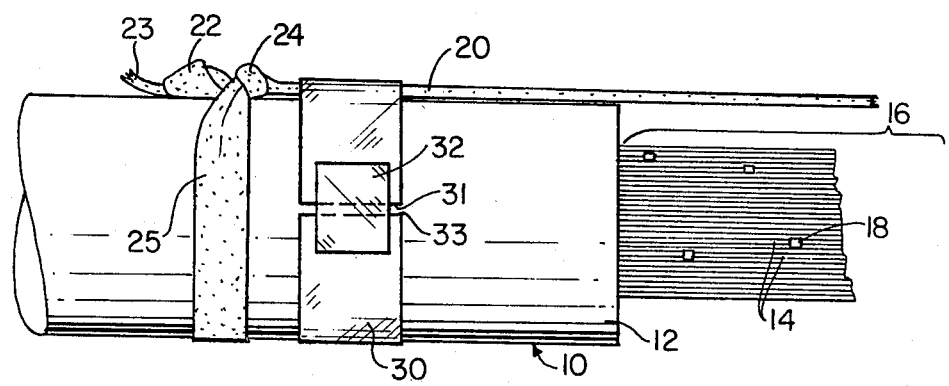

Referring to FIG. 3, a frictional substrate such as emery paper or cloth 30 is placed around an extent of cord 20 and cable jacket 12 between the looped portion 25 and the splice area 16. In addition to emery paper 30, a longitudinal extent or sand paper or other abrasive cloth may also be employed. One particular product found useful in the present invention is a length of emery paper, grade 120, sold by 3M under the trademark ELEK-TRO-CUT. The course side (not shown) of emery paper 30 is placed against the cord 20 and wrapped circumferentially around cable jacket 14. The extent of emery paper 30 may be secured to cable jacket 12 by a piece of vinyl tape 32 or other suitable means (FIG. 4). The piece of tape 32 is shown holding the two free ends 31 and 33 of emery paper 30 together. The vinyl tape 32 may also be wrapped one turn around the cable jacket 14 to hold the emery paper 30 in place. The emery paper 30 need not be tightly secured at this point, as further subsequent securement is provided as described hereinbelow. For optimum results, the emery paper 30 should be placed as close to looped portion 25 as possible.

Figure 5:
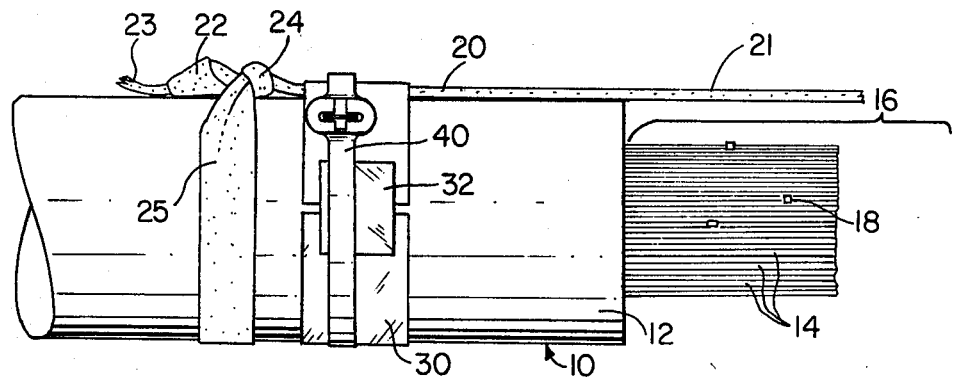
FIG. 5 shows one side of the spliced area of FIG. 1, including the strain relief device applied in accordance with the method present invention.

Referring now to FIG. 5, the final step can be described. In order to securely hold the cord 20 in place around jacket 12, a fastening strap 40 is applied around the jacket 12 over the cord 20, and emery paper 30. Fastening strap 40 is a commercially available self-locking plastic bundling strap used in the electrical industry for securing wire or bundles of wires. One such strap is sold by the assignee of instant invention under the registered trademark "TY-RAP". Strap 40 is secured around cable 10 in a conventional fashion. While strap 40 will compressly attach around jacket 12, it is a plastic member and will not pierce or dig into the plastic jacket 12. Also, as the strap is hand tightened with a suitable hand tool, there is little possibility of over-tightening and causing shine between the conductors 14.

It can be seen that in completed form, the cord 20 will be securely fixed around the cable jacket 12 by strap 40. The strap 40 is held in place on the cable jacket 12 by its own compression against the jacket 12 with the frictional substrate (emery paper 30) interposed thereinbetween. The frictional resistance of the emery paper 30 is sufficient to prevent the strap 40 from sliding along cable jacket 12. The knot 24 of cord 20 forms a stop surface which prevents the cord from sliding out from under the strap 40. As tensile stress is exerted on the cord from central portion 21 the knot 24 will jam against the strap 40 preventing further axial movement. As above-described the looped portion 25 also prevents slippage of cord 20 as upon tensile stress, the cord 20 will tighten around the jacket 12.

Figure 6:
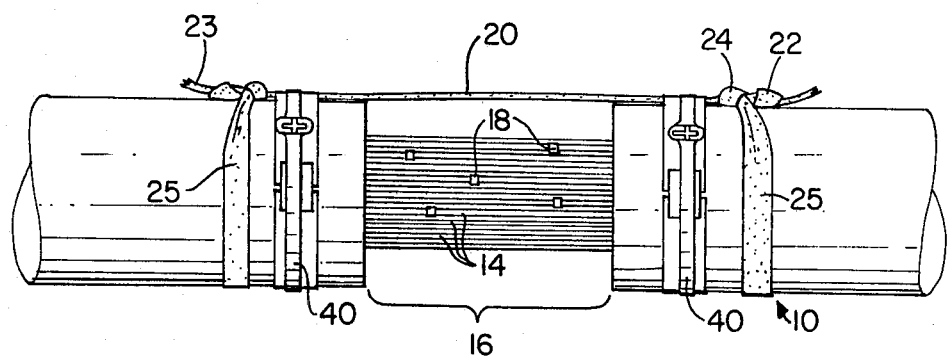
FIG. 6 shows the full cable splice area and completed strain relief device of the present invention.

In FIG. 6, a completed strain relief installation is shown. Each end of an extent of cord 20 is secured to the cable jacket on opposite sides of splice area 16 by the abovedescribed method. In order to provide a tight fit with no slack in the cord 20, one end of cord 20 may be secured to cable 10 first. The slack may then be pulled out from the cord 20 after looping the second end around the cable. As previously mentioned, the exposed cable splice area 16 can be subsequently enclosed by a conventional splice cover. This splice cover can also enclose the strain relief device described herein.

Various other changes to the foregoing, specifically disclosed embodiments and practices will be evident to those skilled in the art. Accordingly, the foregoing preferred embodiments are intended in an illustrative and not in a limiting sense. The scope of the invention is set forth in the following claims.

We claim:

1. A method of strain relieving a splice area of a cable having a plurality of conductors surrounded by an outer insulated jacket, the method comprising the steps of:

placing a length of flexible cord across the cable splice;

securing each end of said flexible cord to said cable jacket, at a position adjacent from said cable splice;

placing a frictional substrate on said cable jacket, over said flexible cord adjacent each end of said cable splice; and applying compressive fastening means to said cable, over said frictional substrate on each side of said splice.

2. A method in accordance with claim 1 wherein said flexible cord is aramid fiber.

3. A method in accordance with claim 2 wherein said securing step includes looping each end of said cord around each end of said cable at a location spaced from said splice area.

4. A method in accordance with claim 1 wherein said frictional susbstrate is emery cloth.

5. The method in accordance with claim 1 wherein said placing step further includes:

securing said frictional substrate to said cable jacket with vinyl tape.

6. A method in accordance with claim 1 wherein said applying step further includes placing a cable tie around said cable adjacent each side of said splice and compressively securing said cable ties to said cable.

7. A method of providing strain relief across an exposed portion of an electrical cable comprising the step of:

selecting a length of flexible cord;

placing a knot in each end of said flexible cord;

looping each said end of said cord around said cable on opposite sides of said exposed portion loosely securing each end to said cable;

pulling said loosely secured ends of said cord apart to remove any slack therebetween;

wrapping an abrasive cloth strip around said cord and said cable adjacent each of said looped ends; and applying a compression strap around said cloth strip, said flexible cord and said cable on each side of said exposed area.

8. A method in accordance with claim 7 wherein said flexible cord is unidirectionally woven aramid fiber.

9. A method in accordance with claim 7 wherein said looping step further includes:

knotting each end of said cord around said cable.

10. A method in accordance with claim 7 including the step of securing said abrasive cloth to said cable over said cord.

11. In a splice for an electrical cable having a jacket surrounding a plurality of conductors, a strain relief apparatus comprising:

a length of flexible cord supported on said cable jacket and secured across splice;

a frictional substrate supported on said cable jacket over said flexible cord adjacent each side of said splice; and compressive fastening means for securing said frictional substrate and said cord to said cable jacket on each side of said splice.

12. An apparatus in accordance with claim 11 wherein said cord is aramid fiber.

13. An apparatus in accordance with claim 11 wherein said cord includes a looped portion on each side of said splice for securing said cord to said jacket.

14. An apparatus in accordance with claim 11 wherein said frictional substrate is emery cloth.

15. An apparatus in accordance with claim 11 wherein said compressive fastening means comprises a cable tie for circumferentially engaging said frictional substrate and frictionally supporting said cord against said jacket.

* * * * *